(12) United States Patent
    Pellenc

(10) Patent No.: US 8,656,597 B2
(45) Date of Patent: Feb. 25, 2014

(54) PORTABLE ELECTRIC TOOL EQUIPPED WITH A DEVICE THAT CAN BE USED TO DETERMINE THE RELATIVE POSITION OF TWO ELEMENTS OF SAID TOOL AT LEAST ONE OF WHICH IS MOVABLE

(75) Inventor: Roger Pellenc, Pertuis (FR)

(73) Assignee: Pellenc (Societe Anonyme), Pertuis (FR)

( * ) Notice: Subject to any disclaimer, the term of this patent is extended or adjusted under 35 U.S.C. 154(b) by 235 days.

(21) Appl. No.: 13/003,362

(22) PCT Filed: Aug. 19, 2009

(86) PCT No.: PCT/FR2009/001015
    § 371 (c)(1),
    (2), (4) Date: Mar. 15, 2011

(87) PCT Pub. No.: WO2010/020721
    PCT Pub. Date: Feb. 25, 2010

(65) Prior Publication Data
    US 2011/0185579 A1    Aug. 4, 2011

(30) Foreign Application Priority Data
    Aug. 22, 2008  (FR) ...................................... 08 04678

(51) Int. Cl.
    *B26B 13/00*    (2006.01)
(52) U.S. Cl.
    USPC .................... 30/194; 30/228; 30/244; 30/249
(58) Field of Classification Search
    USPC ........... 30/228, 249, 247, 197, 241, 194, 244; 200/505; 335/205
    See application file for complete search history.

(56) References Cited

U.S. PATENT DOCUMENTS

| | | | | |
|---|---|---|---|---|
| 3,693,254 | A * | 9/1972 | Salonen | 30/228 |
| 5,002,135 | A * | 3/1991 | Pellenc | 173/170 |
| 5,198,789 | A * | 3/1993 | Taylor | 335/132 |
| 5,867,909 | A * | 2/1999 | Jeltsch et al. | 30/228 |
| 6,260,423 | B1 * | 7/2001 | Garshelis | 73/862.336 |
| 6,936,789 | B2 * | 8/2005 | Hanzel | 219/132 |
| 8,033,025 | B2 * | 10/2011 | Maffeis | 30/228 |
| 8,122,607 | B2 * | 2/2012 | Maniwa et al. | 30/228 |

(Continued)

FOREIGN PATENT DOCUMENTS

| | | |
|---|---|---|
| DE | 19612422 A1 | 10/1997 |
| EP | 0291431 A | 11/1988 |

(Continued)

*Primary Examiner* — Omar Flores Sanchez
(74) *Attorney, Agent, or Firm* — Egbert Law Offices, PLLC

(57) ABSTRACT

Portable electric tool including a body configured to act as a handgrip and at one of the ends of which there is mounted a moving active member, the movements of which are brought about by an actuator, characterized in that the moving part is equipped with an oriented magnetization magnet that can be moved past a magneto-resistive sensor fixed to a fixed element of the body. The trigger is equipped with an oriented magnetization magnet that can be moved past a magneto-resistive sensor fixed to a fixed element of the body. The portable electric tool further includes an electronic board for analyzing the information emitted by each magneto-resistive sensor according to the inclination of the magnetic field lines presented to it, in order to control the operation of the actuator so as to position the moving part accurately according to the position of the control device.

5 Claims, 5 Drawing Sheets

(56) References Cited

U.S. PATENT DOCUMENTS

| | | | |
|---|---|---|---|
| 8,276,280 B2* | 10/2012 | Lee et al. | 30/228 |
| 2004/0055164 A1* | 3/2004 | Molins | 30/228 |
| 2007/0108944 A1* | 5/2007 | Pellenc | 320/130 |
| 2009/0241351 A1* | 10/2009 | Maniwa et al. | 30/228 |
| 2010/0064527 A1* | 3/2010 | Lee et al. | 30/228 |
| 2010/0071218 A1* | 3/2010 | Poole et al. | 30/233 |
| 2010/0269355 A1* | 10/2010 | Yang et al. | 30/228 |
| 2012/0011729 A1* | 1/2012 | Kim et al. | 30/228 |
| 2012/0246942 A1* | 10/2012 | Nie et al. | 30/247 |

FOREIGN PATENT DOCUMENTS

| | | |
|---|---|---|
| EP | 0997706 A | 5/2000 |
| EP | 1074818 A | 2/2001 |
| FR | 2898189 A | 9/2007 |

* cited by examiner

PORTABLE ELECTRIC TOOL EQUIPPED WITH A DEVICE THAT CAN BE USED TO DETERMINE THE RELATIVE POSITION OF TWO ELEMENTS OF SAID TOOL AT LEAST ONE OF WHICH IS MOVABLE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a portable electric tool equipped with a device that can be used to precisely determine, continuously and without contact, the relative position between two cooperating parts of two cooperating elements of said tool, at least one of which is linearly or angularly movable. It can be applied to portable electric tools and, in particular, although not exclusively, to electronic pruning shears or similar tools that have cutting blades whose closure is controllable.

2. Description of Related Art Including Information Disclosed Under 37 CFR 1.97 and 37 CFR 1.98

Most frequently, in devices that involve the linear or angular travel of a movable element according to a user-defined order, we find two cooperating elements such as, in the case of portable electric tools: a control that gives the order and may consist of a trigger; and an actuator that carries out the action and may be connected to the motor by a transmission system.

The connection between the control and the actuator is electronically provided by a control board having a microprocessor and that must also measure the linear or angular travel of the actuator to ensure that the control order has in fact been carried out.

Currently, there exist a variety of devices that can be used to fulfill this function, having their inherent advantages and, especially, their inherent disadvantages.

For example, we know of systems of potentiometric linear or angular sensors used to measure travel through a change in the value of their resistance, this change being linear and processed by an electronic control board. The principal drawbacks of these potentiometric linear or angular sensors are the presence of two parts in contact, which slide against one another, each of which is affixed to one of the moving parts; the length of these devices being equal in length to the travel (linear or angular), they take up space, and their wear, associated with their friction, results in changing precision over time and a relatively short lifecycle.

To avoid contact between the moving parts, systems exist that make use of Hall-effect sensors C1, C2, C3, C4, C5, mounted successively on the fixed part and a radially magnetized magnet affixed to the moving part, the Hall-effect sensors issuing a signal whenever they are presented with a magnetic field.

The drawbacks of this solution, illustrated in FIG. 1, include the necessity of using a large number of costly sensors and, especially, in that it cannot be used to accurately determine the position of the moving part between two sensors, resulting in low precision. The total travel L being the sum of the travels l1+l2+l3+l4, the precision is thus that of the travel between two sensors. It is impossible to determine a random travel position with precision without having an infinite number of sensors, which is physically impossible.

Systems are also known that make use of a magnetoresistive sensor (a particularity of which is that it measures the inclination of field lines in a magnetic field) together with a radially magnetized magnet (magnetization is perpendicular to the magnet).

This solution, illustrated in FIG. 2, has the advantage of being simple and contact free, but it has the disadvantage of lacking precision and requires a considerable distance between sensor and magnet, especially when travel is significant. In this diagram we find that for a given travel, one can measure, at the end of travel, an angle of 45° of the magnet's field line, the distance between the magnet and the sensor "l" must therefore be L/2. Consequently, as the travel increases, distance "l" increases. Additionally, the greater the distance, the stronger the magnet's magnetic field must be in order to be detected by the sensor.

We also know (DE-19612422, EP-0997706, EP-1074818, FR-2898189) of a device for determining the relative position between two cooperating parts at least one of which is linearly movable, one of these parts being equipped with a magnet whose magnetization is oriented, whereas the other part is equipped with a magneto-resistive sensor, wherein the analog electrical information emitted by the magneto-resistive sensor can be analyzed based on the inclination of the magnetic field lines presented to it in order to determine the relative position between the two parts with precision.

The invention concerns the integration of such devices in portable electric tools and, more specifically, in electric pruning shears or similar cutting tools in which it is advantageous to precisely determine and control, continuously and without the contact of mechanical elements, the direction of movement and the position of at least two cooperating parts of such tools.

In a manner known per se, these electric pruning shears have at least one movable cutting blade mounted at the anterior extremity of a body shaped to serve as a handgrip and within which is lodged an electric gear motor whose output is connected to said movable blade by means of a moving drive part or actuator, and a pivoting trigger accessible from the exterior of the body capable of activating an electrical control device.

It is known that into such tools can be integrated devices for controlling, with more or less precision, the position of the blade actuator and, consequently, that of said blade, when the latter is opened and closed, based on the control order given by the user by means of the trigger, so that the movement of said blade is dependent on the movement of said trigger, with a concern for the precision of the cut, comfort, and safety.

In FR-2614568 a description is given of a servocontrolled portable electric tool in position wherein the moving part driving the pivoting blade consists of the ball assembly of a ball bearing ball screw system that can be driven axially in one direction or the other depending on the direction of rotation of the screw, wherein the pivoting trigger used to actuate the electric control device is slaved to said ball whose linear displacements it consequently follows. These rectilinear trajectories of the trigger limit the ball's length of travel to the length of the user's finger. Moreover, because the electric control device moves together with the ball, it is necessary to link said assembly and the connector by means of a flexible link or flexible circuit, such that wear on this flexible circuit may lead to malfunctions.

In FR-2770372 different embodiments of a mechanically activated portable cutting tool are described, wherein the position of the movable cutting blade is detected by various devices that make use of one or more potentiometers, some linear and some rotary, or even through the use of a mixed linear and rotary potentiometer device. We note that in all these cases each potentiometer must be linked, on the one hand, to a moving part and, on the other hand, to the fixed body of the tool by means of oblong grooves for proper operation: in order to transform certain rotational movements into linear movements and due to the fact that the centers of rotation are not necessarily the same for the moving part and the potentiometer in the case of rotary potentiometers. The principal drawback of these devices is that the presence of functional play at the oblong grooves is essential and, consequently, this play necessarily introduces an error in the value of the position transmitted by the potentiometers, this error increasing with operational wear. Other drawbacks follow from the fact that the potentiometers are components that have two tracks in permanent contact that wear quickly if a large number of maneuvers are carried out; additionally, such components are costly and bulky.

WO-2005/084416 describes a mechanically activated cutting tool in which the movable cutting blade is detected by a plurality of Hall-effect sensors distributed along the arc of a circle on a fixed element of the tool body so as to enable the detection of the angular movements of a magnet affixed to an element integral with said pivoting cutting blade. The disadvantage of this device is that it cannot determine with high precision the position of the pivoting cutting blade (the precision is equal to the angle between the two sensors) and is expensive given the need to use a plurality of costly Hall-effect sensors.

Another object of the invention is to provide users with electric pruning shears that are free from the previously described drawbacks of known electric cutting tools and that can be used to provide greater precision and speed during cutting activities, as well as greater safety for users, by very precisely linking the open position of the blade to the position of the trigger controlled by the user.

BRIEF SUMMARY OF THE INVENTION

The electric pruning shears to which the invention is applicable have at least one movable active element at the anterior extremity of a body shaped to serve as a handgrip and within which is lodged an electric gear motor whose output is connected to said movable active element by means of a transmission system. These electric pruning shears further include a pivoting trigger accessible on the exterior of the body and an electronic control device activated by the latter, connected to the electronic control board of the gear motor.

The portable electric tool according to the invention notably comprises on the one hand, an actuator having two cooperating parts at least one of which is linearly or angularly movable, the movable part of this actuator being responsible for the movements of said movable element. On the other hand, a control device is used to control the operation of the actuator, this device comprising two cooperating parts at least one of which is linearly or angularly movable This portable electric tool is especially noteworthy in that one of the cooperating parts of said actuator and said control device is equipped with a magnet whose magnetization is oriented, while the other part is equipped with a magneto-resistive sensor;

Said portable electric tool further having an electronic control and management board comprising a microprocessor, this electronic board being configured to analyze the analog or digital electrical information transmitted by each magneto-resistive sensor depending on the inclination of the magnetic field lines presented to it, in order to control the operation of the actuator and precisely position the movable element based on the position of the control device.

More specifically, on the one hand, a magneto-resistive sensor is fixedly mounted on an element of the body or on an element integral to the body, and the trigger, preferably the free extremity thereof, is equipped with a magnet whose magnetic field lines are oriented, which can be moved with respect to said magneto-resistive sensor by pivoting said trigger. On the other hand, a magneto-resistive sensor is fixedly mounted to the body of the tool and a magnet having oriented magnetic field lines is integrated with the movable ball of the ball bearing ball screw system, and this oriented-magnetic-field-line magnet can be moved with respect to said magneto-resistive sensor by the activation of said ball screw system.

It should be pointed out that the ball screw system can have a movable ball and rotating screw or the reverse, it being understood that the ball screw system that generates a movement of translation from a rotational movement can be replaced by a cam system or even a crankshaft or equivalent device.

Through the above arrangement it is possible to determine the position of the trigger and thus the order issued by the user, as well as the position of the movable active element that activates the blade. Knowing these two positions permanently and precisely, the blade position can be linked to that of the trigger by means of the electronic board controlling the gear motor, and that of the movable active element that activates said blade.

More generally, the invention includes an original arrangement of portable electric tools, in particular electric or electronic pruning shears, according to which particular devices, although known per se, have been adopted to determine the relative position among cooperating elements essential to those apparatuses, constituted, respectively, by the actuator of the movable blade thereof and by the trigger of the control device of this actuator, these devices being controlled by an electronic actuator control board capable of linking movements of the blade to that of the trigger.

The electric pruning shears or similar cutting tool according to the invention also provides other interesting advantages. For example:

it does not have moving electronic components, which provides improved operating reliability;

the distance between the components of the detection device (oriented-magnetization magnet and magneto-resistive sensor) can be short, which avoids the need to use powerful magnets and allows for reduced tool volume;

there is no contact between the components of the detection device and, consequently, no wear of these latter;

it does not require the use of powerful magnets; and it provides a direct reading of the position of the actuator based on the inclination of the magnetic field lines of the magnets; therefore, it is not necessary to perform calculations to determine this position.

BRIEF DESCRIPTION OF THE DRAWINGS

The above objectives, characteristics, and advantages, as well as others, can be better understood from the following description and attached drawings, in which.

DETAILED DESCRIPTION OF THE INVENTION

Reference is made to said drawings in describing an interesting, although not limiting, embodiment of a portable electric tool according to the invention, which, according to this advantageous example, comprises electric pruning shears.

Figure 1:
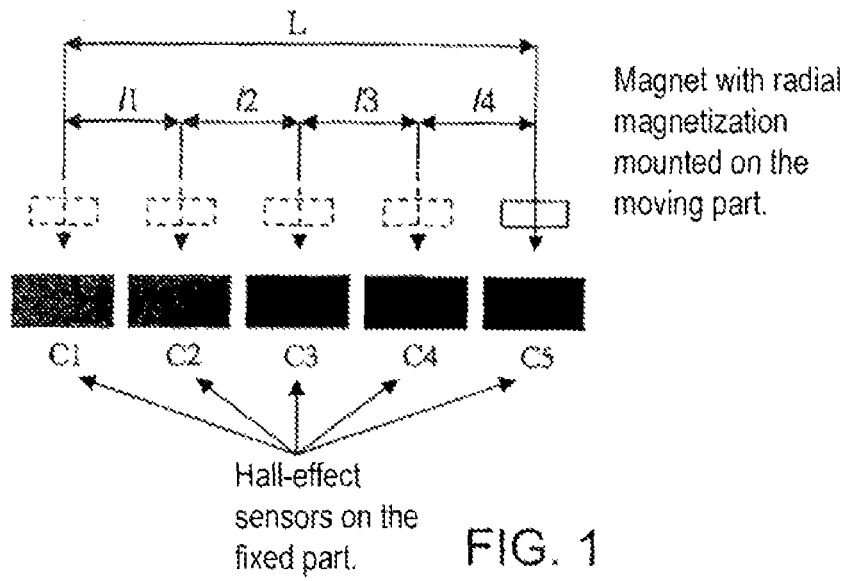
FIG. 1 is a schematic view of a first known detection device that can be used in a system for determining the position of a movable part.
Figure 2:
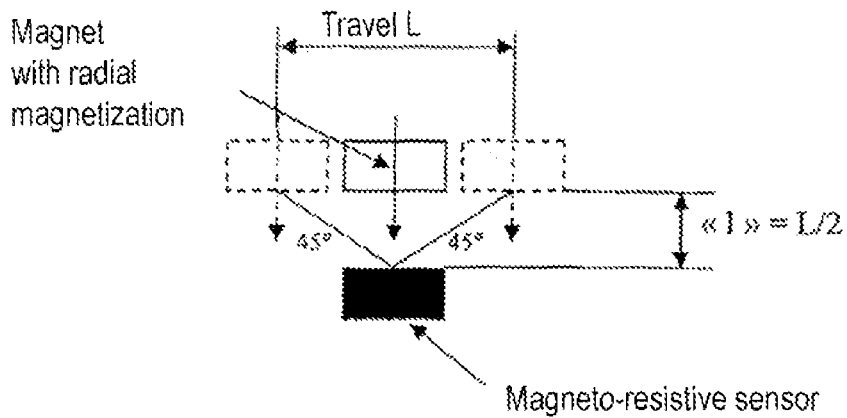
FIG. 2 is a schematic view of another known detection device.
Figure 3:
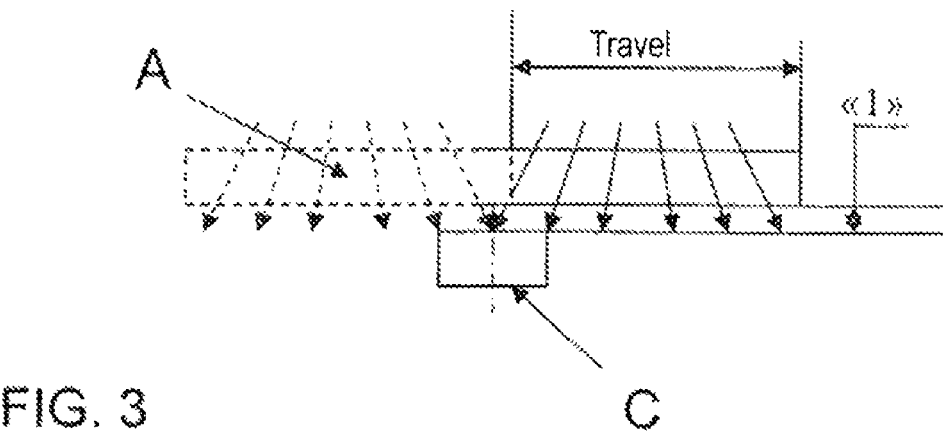
FIG. 3 is a schematic view of a first embodiment of another known detection method, applicable to a system that can be used to determine the position of a linearly moving movable part.
Figure 4:
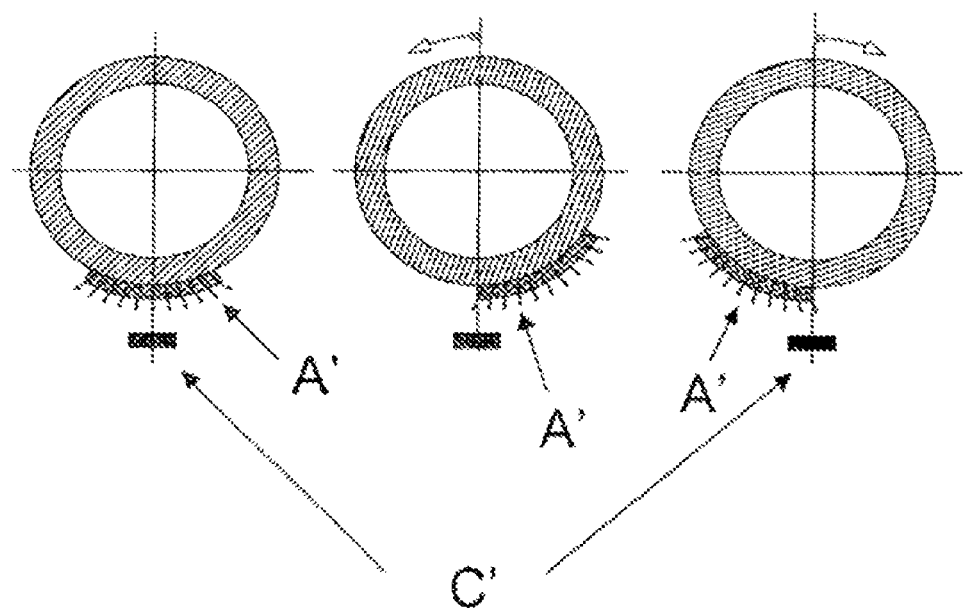
FIG. 4 is a schematic view of a second embodiment of the detection method illustrated in FIG. 3, applicable to a system that can be used to determine the position of an angularly moving movable part.
Figure 5:
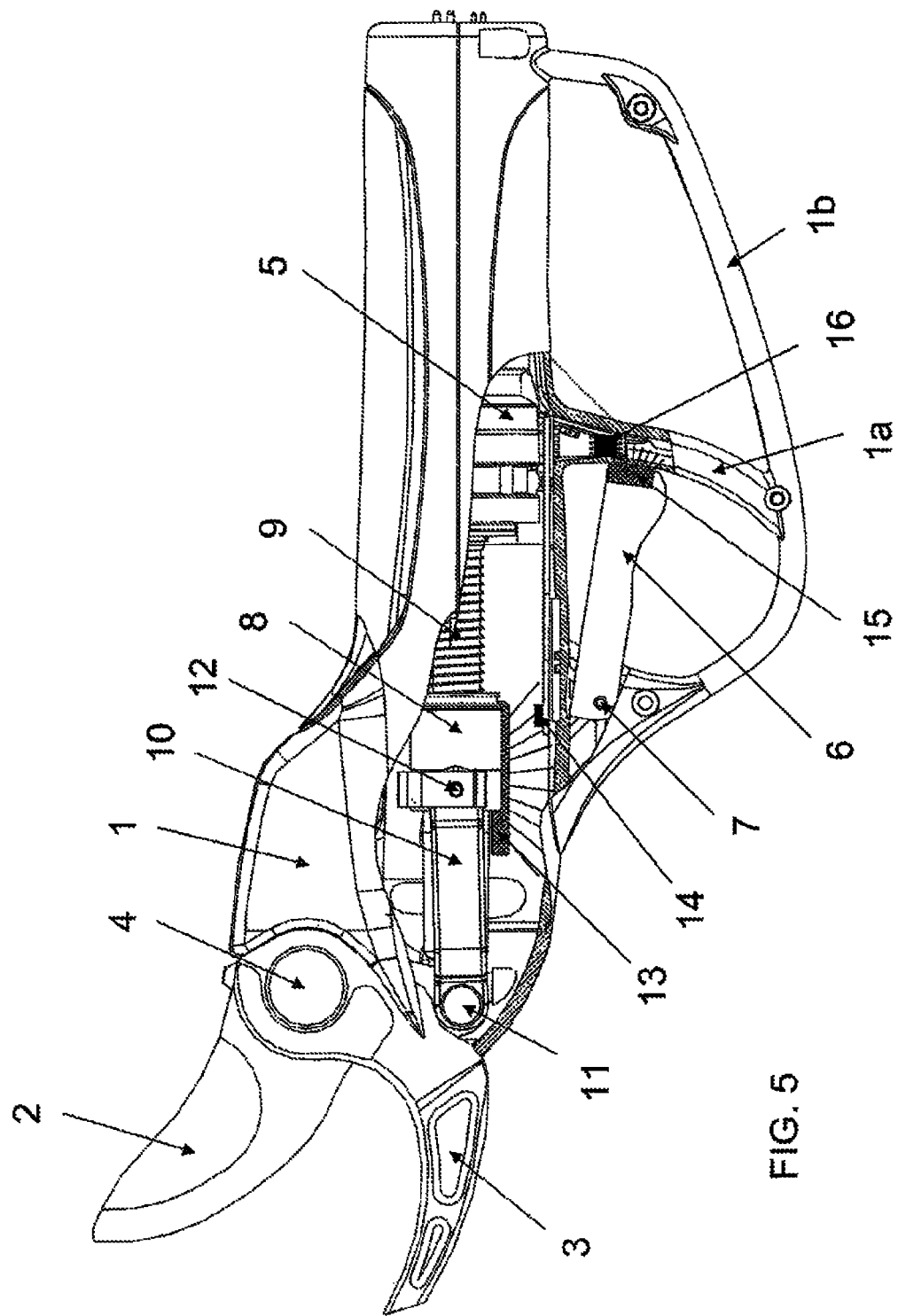
FIG. 5 is an elevation view, with partial cutaways, of an electric pruning shears according to the invention.
Figure 6:
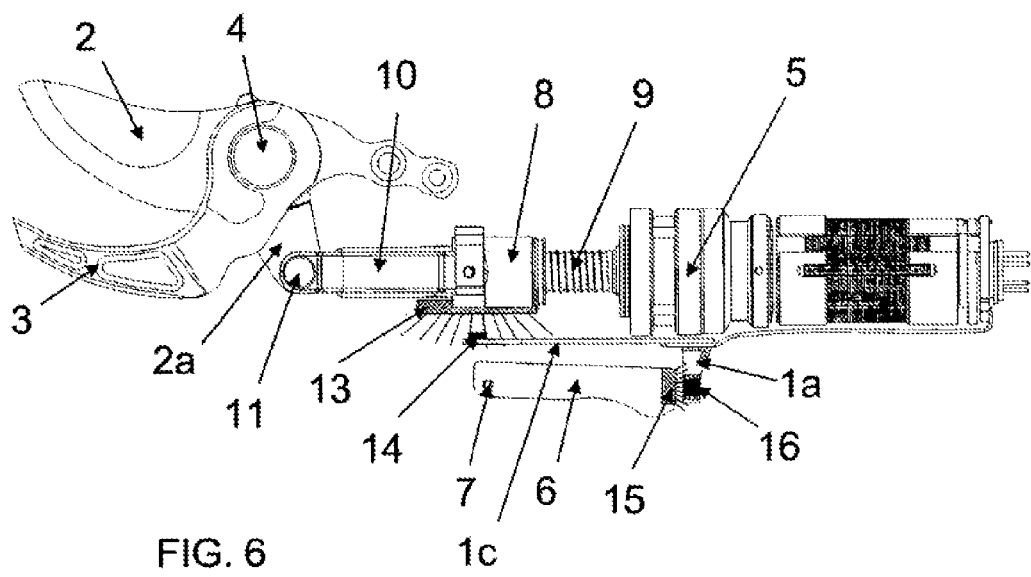
FIG. 6 is a very simplified elevation view of the pruning shears.
Figure 7:
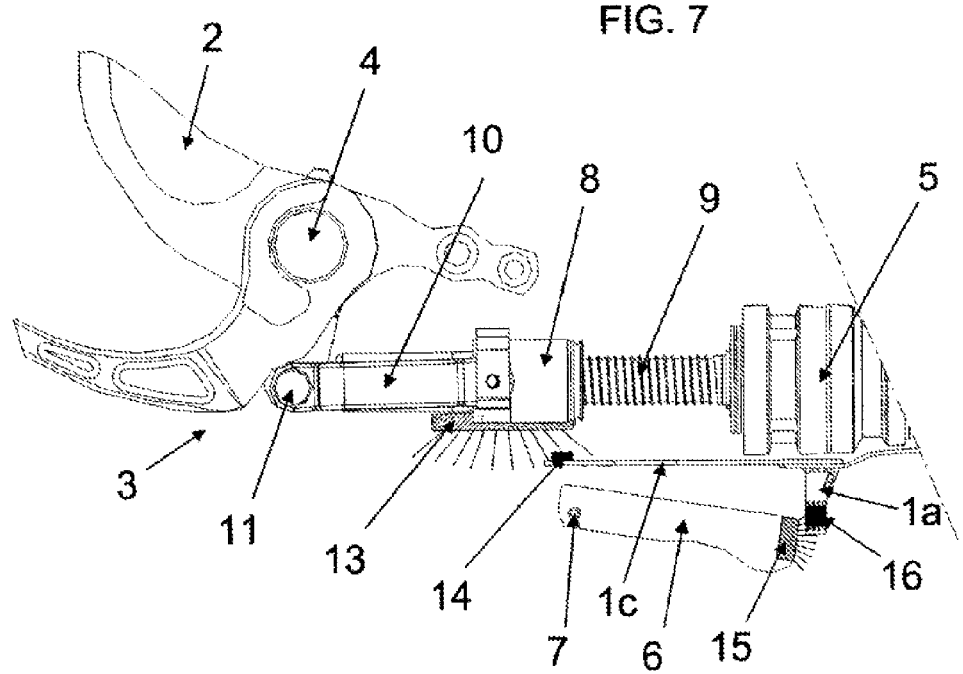
FIG. 7 is an isolated view of FIG. 6 at a greater scale showing the principal components of the pruning shears described by the invention, the movable blade thereof being mounted in completely open position.
Figure 8:
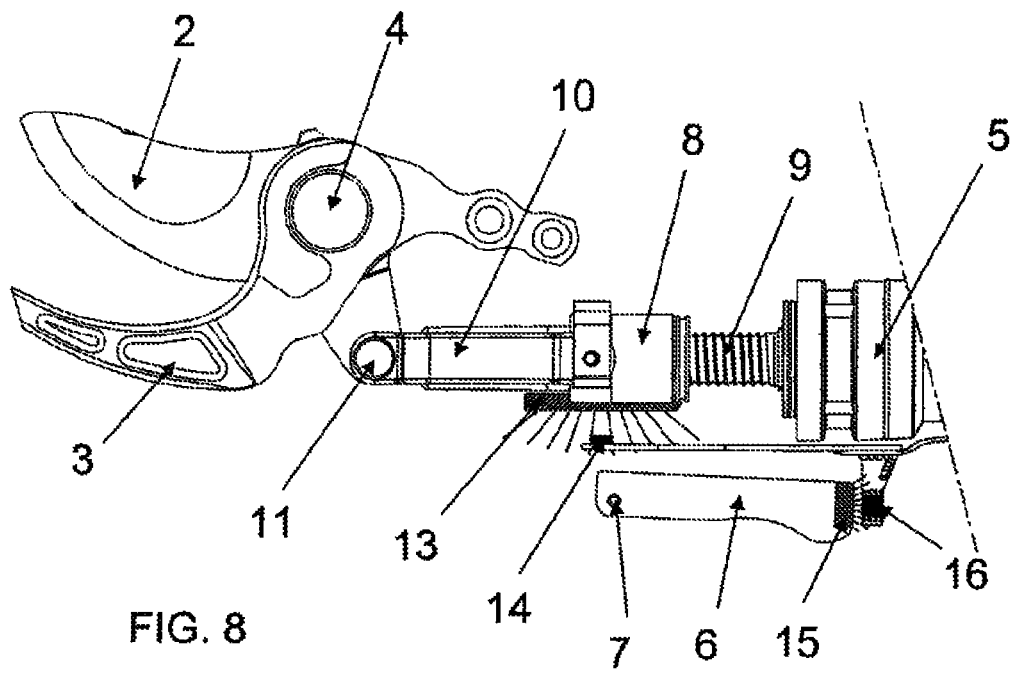
FIG. 8 is an isolated view similar to FIG. 7 and showing the movable blade in partially open position (semi-open).
Figure 9:
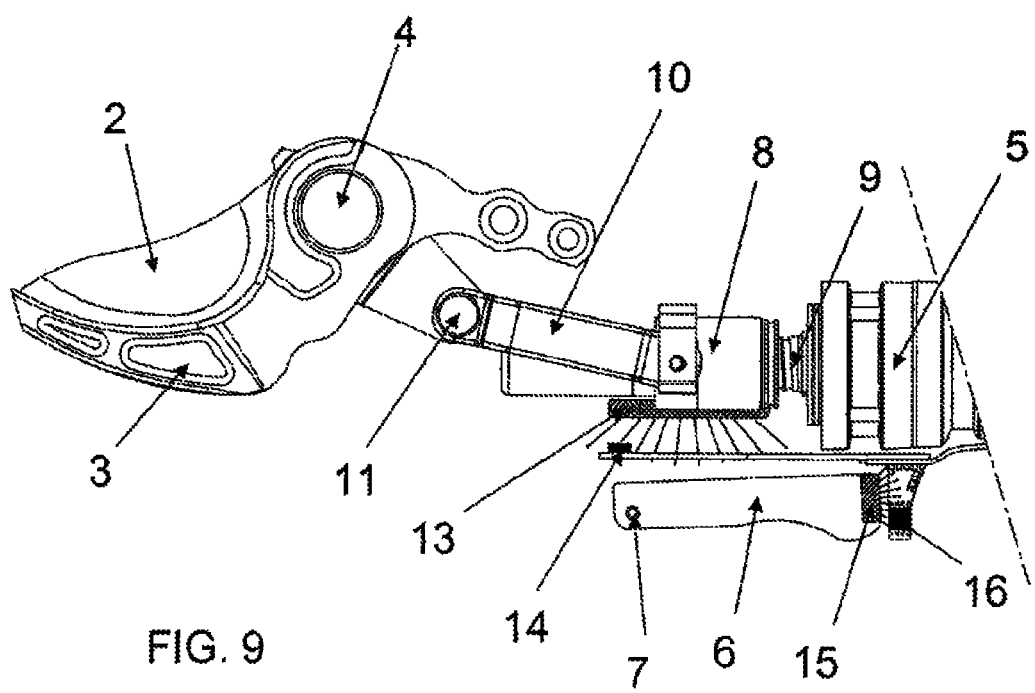
FIG. 9 is an isolated view similar to FIGS. 7 and 8 and showing the movable blade in closed position.

The drawings shown in FIGS. 3 and 4 illustrate two embodiments of the method for determining the relative position between two cooperating parts at least one of which is movable, wherein electromagnetic mechanisms ensure the operation of portable electric tools according to the invention.

According to this method, which is known per se, said movable part is made integral with oriented-magnetization magnet A, that is, a magnet whose magnetic field lines are angled inversely starting from the center thereof, this oriented-magnetization magnet being moved before a magneto-resistive sensor C affixed to a fixed part 1c.

According to the embodiment shown in the drawing of FIG. 3, magnet A is supposed to be affixed to a linearly moving movable part.

The solid line and dashed line illustrate the two extreme positions of the oriented-magnetization magnet A with respect to the magneto-resistive sensor C.

According to a second embodiment illustrated by the operating diagram of FIG. 4, a curved oriented-magnetization magnet A' is affixed to a cylindrical part P that moves angularly. In this drawing, three positions of oriented-magnetization magnet A' are shown with respect to magneto-resistive sensor C:

on the left side of the figure, magnet A' is shown in a central position;

the central portion of the figure shows a counterclockwise angular movement of part P and magnet A';

whereas on the right of the figure, magnet A' is shown after a clockwise movement.

In the three positions, and in every intermediate position comprised between the extreme positions thereof, the magnetic field lines of oriented-magnetization magnet A' are detected by magneto-resistive sensor C.

It is also known that the magnetic field lines of magnet A' are gradually inclined in proportion to their distance from the center of said magnet, for example, 1° for 1 mm, then 2° for 2 mm, and so on.

By using a magneto-resistive sensor that can determine the degree of inclination of the magnet's magnetic field lines, it is possible to deduce the angular value of the magnet's travel and, consequently, of part P (1 mm for 1°, according to the above example).

This deduction and the management of the measured travel are performed by an electronic control board that comprises a microprocessor and that receives the signals issued by sensor C.

The invention relates to a portable electric tool having a body 1 shaped to serve as a handgrip and at one of whose extremities is mounted a movable active element 2 whose movements are engendered by an actuator 8 and a control device 6 capable of controlling the operation of said actuator via an electronic command and control board. This portable electric tool is notably remarkable in that said actuator 8 makes use of the device for determining the relative position between two parts, at least one of which is movable, the motion thereof being linear or angular as previously described; and/or in that control device 6 makes use of this device for determining the relative position between one of those parts, at least one of which is movable.

Below we describe a very advantageous application of the invention to electric or electronic pruning shears. It should be borne in mind, however, that it can also be applied to other portable electric tools with cutting blades, such as garden shears.

Electric or electronic pruning shears generally comprise a hollow body 1 shaped to serve as a handgrip and at the anterior extremity of which is mounted a cutting head having at least one movable active element 2. Generally, this active element consists of a pivoting cutting blade mounted on a counterblade or fixed hook 3 by means of an axis of articulation 4. Within body 1 is lodged a gear motor 5 whose output is connected to said movable active element 2 by means of a transmission system. These electric or electronic pruning shears further have a control device having a trigger 6 mounted with the ability to pivot about an axis 7 and accessible on the exterior of body 1.

According to an advantageous embodiment, the transmission system connecting the output of gear motor 5 to movable blade 2 comprises a movable drive part including ball 8 of a ballscrew system 8-9 and a pair of rods 10.

Rotating screw 9 is coupled to the output of gear motor 5, while axially movable ball 8 is connected, by means of pair of rods 10 and articulations, to an extension or lever 2a presented by pivoting blade 2.

More specifically, rods 10, by means of articulations 11 and 12, are coupled, respectively, to extension 2a of pivoting blade 2 and to ball body 8 constituting the tool's actuator. In this way any linear movement of the latter brings about, by means of rods 10, a pivoting movement of movable blade 2 around axis 4, closing and opening said blade with respect to the fixed blade or hook 3.

According to a characteristic arrangement, the portable electric tool has:

on the hand, a magnet with oriented magnetic field lines 13 fixedly mounted on movable ball 8 and a magneto-resistive sensor 14 fixedly mounted to body 1 at a location before which said oriented-magnetization magnet 13 travels during the forward and backward linear movements of said ball 8; and on the other hand, a magnet with oriented magnetic field lines 15 affixed to trigger 6, preferably on the free extremity thereof and, in an element 1a of body 1, or on an element integral with the body, a magneto-resistive sensor 16 is fixedly mounted, at a location before which moves said oriented-magnetization magnet 15 equipping the free extremity of pivoting trigger 6 during pivoting movements thereof.

Advantageously, magneto-resistive sensor 16 is fixedly mounted in a connecting part 1a rigidly connecting body 1 and the tool's protective guard 1b, which has the benefit of strengthening this guard and making use of the tool more comfortable, especially to prevent it from recoiling in the hand when working at a height.

The signals issued by magneto-resistive sensor 14 are transmitted to an electronic control board (not shown) configured and programmed to control gear motor 5 and thus control the opening or closing of movable blade 2 and also the stopping of said blade in any intermediate position between closed and fully open.

The signals issued by magneto-resistive sensor 16 are transmitted to an electronic control board (not shown) configured and programmed to control gear motor 5; this electronic control board can be the same as that which receives the signals issued by magneto-resistive sensor 14.

More specifically, this electronic control and management board comprising a microprocessor is configured to analyze the analog or digital electrical information transmitted by each magneto-resistive sensor 14, 16, depending on the inclination of the magnetic field lines presented to it, to control the operation of actuator 8 in order to precisely position movable element 2 based on the position of control device 6.

It is understood that the invention can be applied to the control system of actuator 8 of pivoting blade 2 (oriented-magnetization magnet 13 and magneto-resistive sensor 14) to determine and control the opening thereof as well as to the control system comprising trigger 6 (oriented-magnetization magnet 15 and magneto-resistive sensor 16) to determine the travel of said control trigger.

It is further understood that when trigger 6 and, thus, associated oriented-magnetization magnet 15 is moved by a certain angle (the value of the movement of blade 2 desired by the user), magneto-resistive sensor 16 reads an angle of inclination of the magnetic field of said magnet 15 corresponding to the angular displacement of said trigger 6.

This value read by magneto-resistive sensor 16 is transmitted to the electronic command and control board of gear motor 5, which gives the order to said motor to set itself in motion and thereby actuate, in the desired direction, the ball-bearing ballscrew device 8-9, in order to move blade 2 by means of rods 10.

When ball 8 moves to realize this action, oriented-magnetization magnet 13, which is affixed to said ball, moves in front of magneto-resistive sensor 14 affixed to body 1 of the tool.

When magneto-resistive sensor 14 reads an angle of inclination of the magnetic field of oriented-magnetization magnet 13 corresponding to the movement controlled by the electronic control board, the latter immediately stops gear motor 5.

It can be seen that, in this manner, it is possible to precisely control the position of blade 2 during opening and closing and, therefore, to precisely link it to the position of the trigger controlled by the user.

In short, the invention includes integrating, at determinate locations of portable electric tools such as electric or electronic pruning shears, particular devices for determining the relative position between cooperating elements essential to such devices, constituted, respectively, by the actuator of the movable blade thereof and by the trigger of the control device of said actuator, these devices being managed by an electronic board capable of very precisely linking movements of the blade to that of the trigger.

Obviously, it would be possible, for the trigger and with respect to pruning shears whose blade is actuated directly by a rotating and nonlinear device (for example, pruning shears of the type described in FR-2670372, WO-2005/084416), to apply the constructive solution described to angular movements as illustrated in FIG. 4.

I claim:

1. A. portable electric cutting tool comprising:
    a body having a handgrip and baying a movable active element at one end thereof;
    an actuator positioned in said body, said actuator having a pair of cooperating parts, one of said pair of cooperating parts being movable linearly or angularly so as to move said active element of said body;
    a control device cooperative with said actuator so as to control an operation of said actuator, said control device baying a pair of cooperating parts, one of said pair of cooperating parts of said actuator having a magnet with a magnetization oriented in a direction and another of said pair of cooperating pans of said actuator having a magneto-resistive sensor, one of said pair of cooperating parts of said control device having a magnet with a magnetization oriented in a direction and another of said pair of cooperating parts of said control device having a magneto-resistive sensor; and
    an electronic control board having a microprocessor, said electronic control board configured such that analog or digital electrical information transmitted by the magneto-resistive sensors can be analyzed based on an inclination of magnetic field lines to the magneto-resistive sensors, said electronic control board for controlling said actuator for positioning said movable element based on a position of said control device.

2. The portable electric cutting tool of claim 1, said magnet of said one of said pair of cooperating parts of said actuator movable forward of said magneto-resistive sensors of said actuator.

3. The portable electric cutting tool of claim 1, said control device comprising:
    a trigger for controlling the operation of said actuator by said electronic control board, said magnet of said control device affixed to a stationary element integral with said body, said magnet of said trigger positioned forward of said magneto-resistive sensor of said stationary element.

4. The portable electric cutting tool of claim 1, said control device comprising:
    an electric gear motor housed within said body, said electric gear motor having an output connected to said movable active element of a transmission system; and
    a pivotable trigger cooperative with said electronic control board, said trigger having a free end, said magnet of said control device mounted to said free end of said trigger, said magneto-resistive sensors of said control device fixedly mounted onto an element integral to said body.

5. The portable electric cutting tool of claim 1, said actuator having a movable ball of a ballbearing ballscrew system, said magnet of said actuator affixed to said movable ball, said magnet of said actuator being movable by activation of said ballbearing ballscrew system, said magneto-resistive sensors of said actuator fixedly mounted to said body.

* * * * *